US010142898B2

(12) United States Patent
Baek et al.

(10) Patent No.: US 10,142,898 B2
(45) Date of Patent: *Nov. 27, 2018

(54) METHOD AND APPARATUS FOR TRANSMITTING DATA THROUGH INTER-ENB CARRIER AGGREGATION IN WIRELESS COMMUNICATION SYSTEM

(71) Applicant: Samsung Electronics Co., Ltd., Suwon-si, Gyeonggi-do (KR)

(72) Inventors: Youngkyo Baek, Seoul (KR); Songyean Cho, Seoul (KR); Sung Hwan Won, Suwon-si (KR); Hanna Lim, Seoul (KR); Sangsoo Jeong, Suwon-si (KR); Beomsik Bae, Suwon-si (KR); Erik Guttman, Waibstadt (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,827

(22) Filed: Dec. 22, 2017

(65) Prior Publication Data

US 2018/0124662 A1 May 3, 2018

Related U.S. Application Data

(63) Continuation of application No. 15/438,056, filed on Feb. 21, 2017, now Pat. No. 98,608,118, which is a
(Continued)

(30) Foreign Application Priority Data

Oct. 31, 2012 (KR) ........................ 10-2012-0122574

(51) Int. Cl.
*H04W 36/08* (2009.01)
*H04W 76/27* (2018.01)
(Continued)

(52) U.S. Cl.
CPC ........... *H04W 36/08* (2013.01); *H04L 9/0891* (2013.01); *H04W 12/04* (2013.01);
(Continued)

(58) Field of Classification Search
CPC ..... H04W 36/08; H04W 76/27; H04W 12/04; H04W 36/0027; H04W 36/0061; H04W 76/20; H04L 9/0891
See application file for complete search history.

(56) References Cited

U.S. PATENT DOCUMENTS

2012/0014352 A1* 1/2012 Giaretta ................ H04W 76/11
370/331
2012/0094608 A1 4/2012 Shi et al.
(Continued)

FOREIGN PATENT DOCUMENTS

KR 10-2012-0078833 A 7/2012
WO 2012/023161 A1 2/2012
WO 2012/134567 A1 10/2012

*Primary Examiner* — Ajay Cattungal
(74) *Attorney, Agent, or Firm* — Jefferson IP Law, LLP (57) ABSTRACT

The present invention relates to a method and an apparatus for transmitting data to user equipment through not only a current base station cell but also a neighboring base station cell via inter-eNB CA in a wireless communication system. A method for transmitting data though carrier aggregation in the wireless communication system, according to the present invention, comprises the steps of: a first base station transreceiving data with a terminal through at least two PDN connections; the first base station transmitting a carrier aggregation request message to a second base station for aggregating carriers, when the first base station determines to carry out inter-eNB carrier aggregation; the first base station receiving a carrier aggregation reply message from the second base station in response to the carrier aggregation request message; the first base station performing an RRC reconfiguration process with the terminal to notify to the
(Continued)

terminal of the determination to perform the inter-eNB carrier aggregation; and the first base station transmitting a path change request message to a mobile management entity to correct a data transreceiving path, so that data on at least one PDN connection from among the PDN connections is transreceived through the second base station.

20 Claims, 5 Drawing Sheets

Related U.S. Application Data continuation of application No. 14/433,541, filed as application No. PCT/KR2013/009796 on Oct. 31, 2013, now Pat. No. 9,578,566.

(51) Int. Cl.
- *H04W 12/04* (2009.01)
- *H04W 36/00* (2009.01)
- *H04L 9/08* (2006.01)
- *H04W 76/20* (2018.01)

(52) U.S. Cl.
CPC ... *H04W 36/0027* (2013.01); *H04W 36/0061* (2013.01); *H04W 76/20* (2018.02); *H04W 76/27* (2018.02)

(56) References Cited

U.S. PATENT DOCUMENTS

| | | | |
|---|---|---|---|
| 2012/0236801 A1 | 9/2012 | Krishnaswamy et al. | |
| 2012/0302240 A1* | 11/2012 | Tamaki | H04W 36/0011 455/436 |
| 2013/0003697 A1* | 1/2013 | Adjakple | H04W 36/0011 370/331 |
| 2013/0250881 A1* | 9/2013 | Liao | H04W 36/08 370/329 |
| 2013/0329694 A1* | 12/2013 | Vrzic | H04W 36/165 370/331 |
| 2014/0010207 A1* | 1/2014 | Horn | H04W 36/165 370/332 |
| 2014/0078989 A1* | 3/2014 | Guo | H04W 72/0426 370/329 |
| 2014/0133428 A1* | 5/2014 | Kazmi | H04L 5/0098 370/329 |

* cited by examiner

METHOD AND APPARATUS FOR TRANSMITTING DATA THROUGH INTER-ENB CARRIER AGGREGATION IN WIRELESS COMMUNICATION SYSTEM

CROSS-REFERENCE TO RELATED APPLICATION(S)

This application is a continuation application of prior application Ser. No. 15/438,056, filed on Feb. 21, 2017, which issues as U.S. Pat. No. 9,860,811 on Jan. 2, 2018, which is a continuation application of prior application Ser. No. 14/433,541, filed on Apr. 3, 2015, which issued as U.S. Pat. No. 9,578,566 on Feb. 21, 2017, which is a National Stage Application under 35 U.S.C. § 371 of an International Application filed on Oct. 31, 2013 and assigned application number PCT/KR2013/009796, which claimed the benefit under 35 U.S.C § 119(a) of a Korean patent application filed on Oct. 31, 2012 in the Korean Intellectual Property Office and assigned Serial number 10-2012-0122574, the entire disclosure of each of which is hereby incorporated by reference.

TECHNICAL FIELD

The present invention relates to a wireless communication system and, in particular, to a data transmission method and apparatus of a User Equipment (UE) capable of inter-evolved Node B (eNB) Carrier Aggregation for use of neighboring eNBs as well as the current eNB. Also, the present invention relates to a method and apparatus for communicating data of a specific PDN connections through cells of a neighboring eNB or pico cells to provide in a better condition.

BACKGROUND ART

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

In the wireless communication system, a terminal connects to a network via a base station (hereinafter, the term 'eNB' is interchangeably used therewith) for data communication. However, since the bandwidth of the eNB is restrictive, it may not satisfy the service quality requirements of the users.

There is therefore a need of a method for dispersing the data of a specific Packet Data Network (PDN) connection to neighboring eNBs while transmitting some data of the PDN connection trough the current eNB to facilitate providing the communication service.

Technical Problem

The present invention has been conceived to solve the above problem and aims to provide a method and apparatus of providing the communication service in a good quality for the respective PDN connections in such a way of, when it is difficult for an eNB to guarantee a high enough data rate, transmitting the data occurring on a certain PDN connection through neighboring eNBs.

Solution to Problem

In order to solve the above problems, the method of transmitting data using inter-base station carrier aggregation in a wireless communication system according to the present invention is characterized by moving a bearer corresponding to a PDN connection served by a certain eNB to a neighboring cell. For this purpose, the method includes, checking, at an MME, whether the UE and the eNB supports inter-eNB Carrier Aggregation (CA) in the initial attach procedure, notifying the eNB of the inter-eNB CA availability, determining, when generating a PDN connection, whether it is a PDN connection movable in the inter-eNB CA, marking the PDN connection in order for the eNB to identify the corresponding PDN connection, detecting, at the eNB (PCell), the inter-eNB CA necessity, sending, at the eNB (PCell), the information on the bearers corresponding to the PDN connection to be moved to the neighboring eNB (SCell), and notifying this to the S-GW via the MME, and transmitting the data on the PDN connection moved to the SCell via the eNB (SCell) instead of the eNB (PCell).

Another method proposed in the present invention includes detecting, at a PCell or an SCell, the difficult of maintaining the inter-eNB CA and moving the bearer serving at the SCell back to the PCell.

Another method proposed in the present invention includes transmitting a encryption key for use in data communication through SCell, exchanging the encryption key, and generating the encryption key.

Advantageous Effects of Invention

The present invention is advantageous in terms of facilitating data communication in such a way of transmitting, when the bandwidth of an eNB is not enough for guaranteeing the service quality, the data on a specific PDN connection through a neighboring eNB (SCell).

MODE FOR THE INVENTION

Exemplary embodiments of the present invention are described with reference to the accompanying drawings in detail. Detailed description of well-known functions and structures incorporated herein may be omitted to avoid obscuring the subject matter of the present invention.

The following description of the embodiment of the present invention proposes a method and apparatus for moving the bearers corresponding to some PDN connections that are served by an eNB to a neighbor eNB (SCell) in a wireless communication system.

Figure 1:
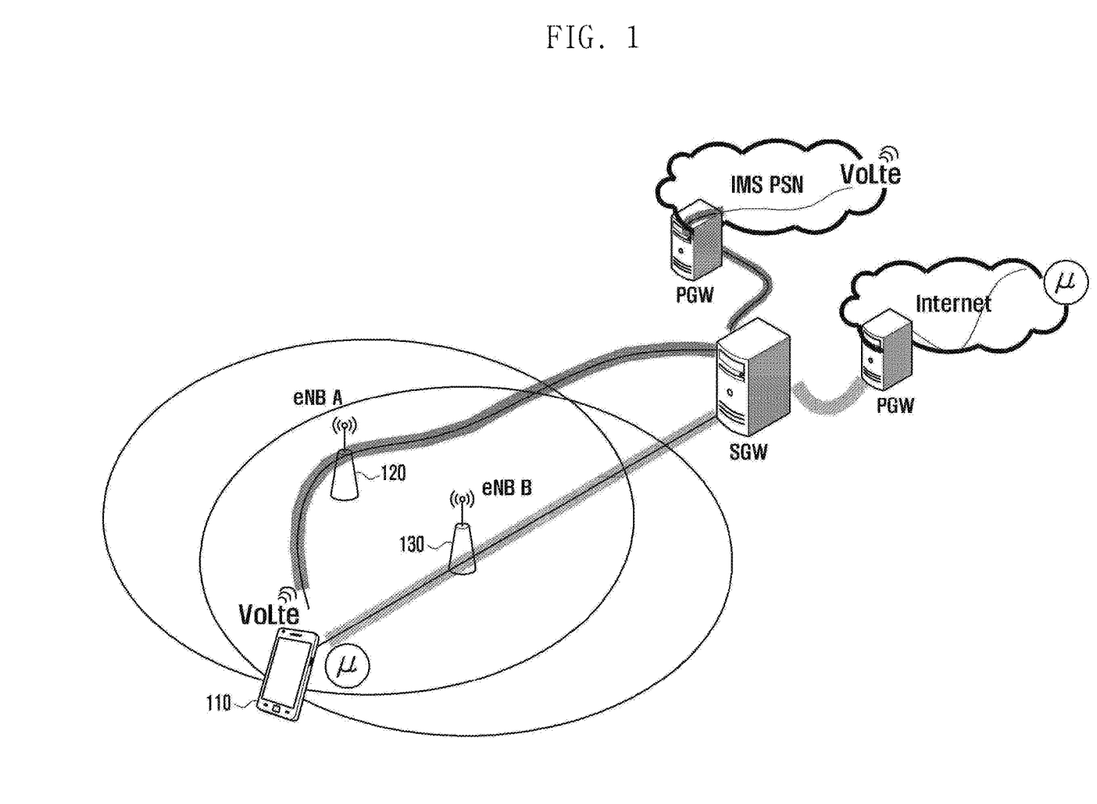
FIG. 1 is a diagram illustrating a structure of connections between nodes of the wireless communication system and a process of providing data communication between the nodes according to an embodiment of the present invention.

FIG. 1 is a diagram illustrating a structure of connections between nodes of the wireless communication system and a process of providing data communication between the nodes according to an embodiment of the present invention.

In FIG. 1, it is assumed that a certain UE 110 uses Voice over LTE and high volume data transmission services simultaneously. According to an embodiment of the present invention, in such a case, if it is difficult for the eNB A 120 to guarantee the quality requirement of the user, a neighboring eNB B 130 is responsible for the high volume data transmission service while the eNB A is responsible for the Voice over LTE data transmission.

By dispersing the load of the eNB to neighboring eNBs as described above, it is possible to facilitate the data transmission.

In the following description of the embodiment of the present invention, the eNB A maintaining a RRC connection with the UE is referred to as Primary Cell (PCell), and the eNB B which has no RRC connection but acquire the control information through the PCell is referred to as Secondary Cell (SCell).

Figure 2:
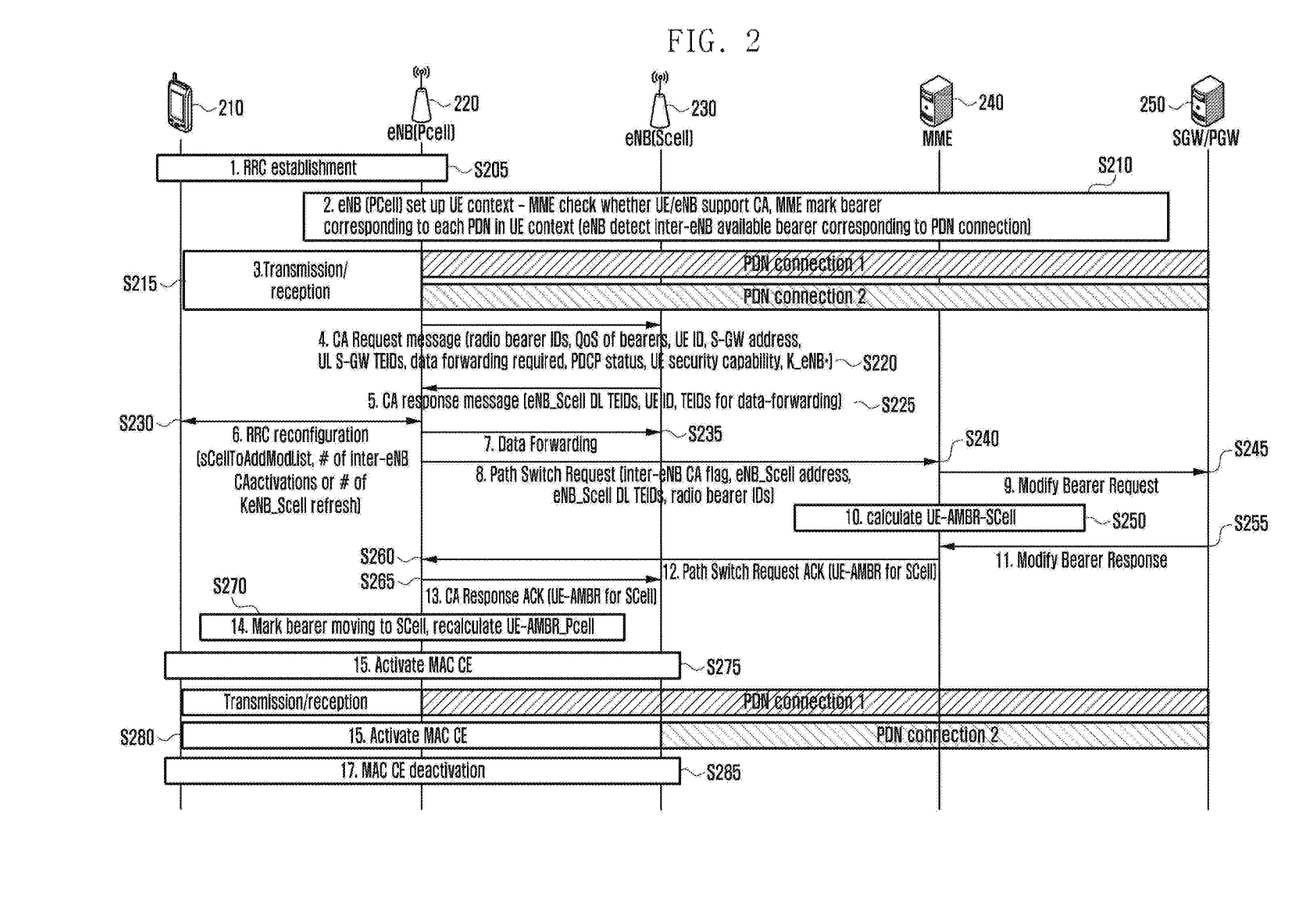
FIG. 2 is a signal flow diagram illustrating a data communication procedure through carrier aggregation according to an embodiment of the present invention.

FIG. 2 is a signal flow diagram illustrating a data communication procedure through carrier aggregation according to an embodiment of the present invention.

As shown in FIG. 2, the UE 210 establishes an RRC connection with the eNB (PCell) 220 at step S205.

The MME 250 checks whether the eNB (PCell) 220, the eNB (SCell), and the UE support inter-eNB CA in the UE's access procedure or prior thereto and notifies the eNB (PCell) 220 whether it is possible to perform the inter-eNB CA through an S1-AP message at step S210.

The MME 240 also determines whether there is a PDN connection movable in the middle of inter-eNB CA, when generating the PDN connection, and stores a UE context including the identifiers indicating the bearers in order for the eNB (PCell) 220 to identify the corresponding PDN connection. The bearer identifier may include the information on whether to move to a SCell and the information capable of allowing the eNB to identify the bearer per PDN connection in the inter-eNB CA environment.

In the case that there are two PDN connections before performing the inter-eNB CA, the data communications on both the PDN connections are performed through the eNB (PCell) 220 as shown in at step S215.

In the inter-eNB CA, the eNB (PCell) 220 becomes aware that it is configured that the bearers of PDN connection 1 are remained in the PCell and the bearers of PDN connection 2 move to a SCell.

Afterward, if it is determined to perform the inter-eNB CA, the eNB (PCell) 220 sends the eNB (SCell) 230 a CA request message at step S220. The CA request message may include IDs of the bearers moving to the SCell (i.e. Radio Bearer IDs), QoS of bearers, UE ID (e.g., S-TMSI), address of the serving gateway (GW) to be used by the SCell, uplink Serving GW TEIDs, data forwarding requirement indicator, forwarding related information, Packet Data Convergence Protocol (PDCP) status, UE security capability notifying of security algorithm and the like, and K_eNB*generated for use at the eNB (SCell).

At this time, if the eNB (PCell) 220 and the eNB (SCell) 230 use the same AS key, the newly generated K_eNB*may be used as K_eNB in the eNB (PCell) 220 as well as the eNB (SCell) 230.

A description is made of the method of generating the K_eNB*in detail hereinafter.

Upon receipt of the CA request message, the eNB (SCell) 230 transmits a CA response message to notify that the inter-eNB CA is prepared at step S225. The CA response message may include the TEID in transmitting, at the serving GW, the downlink data to the eNB (eNB_Scell DL TEIDs) and the TEIDs for use in forwarding the UE ID (e.g., S-TMSI) and data (TEIDs for data-forwarding).

Upon receipt of the CA response message, the eNB (PCell) 220 performs the RRC reconfiguration procedure at step S230 to notify the UE of the configuration of the inter-eNB CA to the eNB (SCell) 230 through sCellToAddModList.

In the RRC reconfiguration procedure, the RRC reconfiguration request message may include # of Inter-eNB CA activations to prevent, when the eNB (PCell) 220 and the eNB (SCell) 230 use the same AS key, the AS key used previously from being reused AS key of the eNB (SCell) 230. Upon receipt of # of inter-eNB CA activations, the UE references the value in generating the K_eNB*which is identical with the K_eNB*to be used by the eNB (PCell) 220. A description is made of the method of generating K_eNB*in detail hereinafter.

In the case that the eNB (PCell) 220 and the eNB (SCell) 230 use different AS keys, in order to prevent the AS key of the eNB (SCell) 230 from matching a previously generated AS key, # of inter-eNB CA activations or # of KeNB_Scell refresh may be included according to the AS key management method of the eNB (SCell) 230. The UE generates the K_eNB*by referencing this information. A description is made of the method of generating the K_eNB*used by the eNB (SCell) 230 in detail hereinafter.

If a RRC reconfiguration complete message is received in the RRC reconfiguration procedure, the eNB (PCell) 220 fords the data to the eNB (SCell) at step S235.

Then the eNB (PCell) 220 sends the MME 240 a Path Switch Request message at step S240. The Path Switch Request message may include an inter-eNB CA flag indicating the inter-eNB CA, an address of the eNB (SCell), TEIDs to be used by the serving GW in downlink (eNB_Scell DL TEIDs), and IDs of the bearers moving to the SCell (radio bearer IDs).

Upon receipt of the Path Switch Request message, the MME 240 sends the serving GW/PDN GW 250 a Modify Bearer Request message at step S245 to modify the paths of the corresponding bearers.

The MME 240 calculates UE AMBR for the SCell (UE-AMBR_Scell) at step S250, receives a Modify Bearer Response message at step S255, and sends the eNB (PCell) 220 a Path Switch Request Ack message including the UE AMBR (UE-AMBR_Scell) at step S260.

The eNB (PCell) 220 sends the eNB (SCell) 230 the UE AMBR for SCell (UE-AMBR_Scell) through a CA Response Ack message at step S265. Meanwhile, the eNB (PCell) 220 checks the bearers to be moved to the eNB (SCell) 230 and calculates the UE AMBR for the PCell (UE-AMBR_Pcell) at step S270. For example, the calculation may be conducted as UE-AMBR_Pcell=UE-AMBR−UE-AMBR_Scell.

If the inter-eNB CA is configured completely, the eNB (PCell) 220 or the eNB (SCell) 230 activates the inter-eNB CA through Activation MAC Control Element (CE) at step S275, and the PDN connection 2 is used to communicate data with the UE via the eNB (SCell) 230 at step S280.

In order to deactivate the inter-eNB CA, the eNB (PCell) 220 or the eNB (SCell) 230 may transmit a Deactivation MAC CE to deactivate the inter-eNB CA at step S285.

Figure 3:
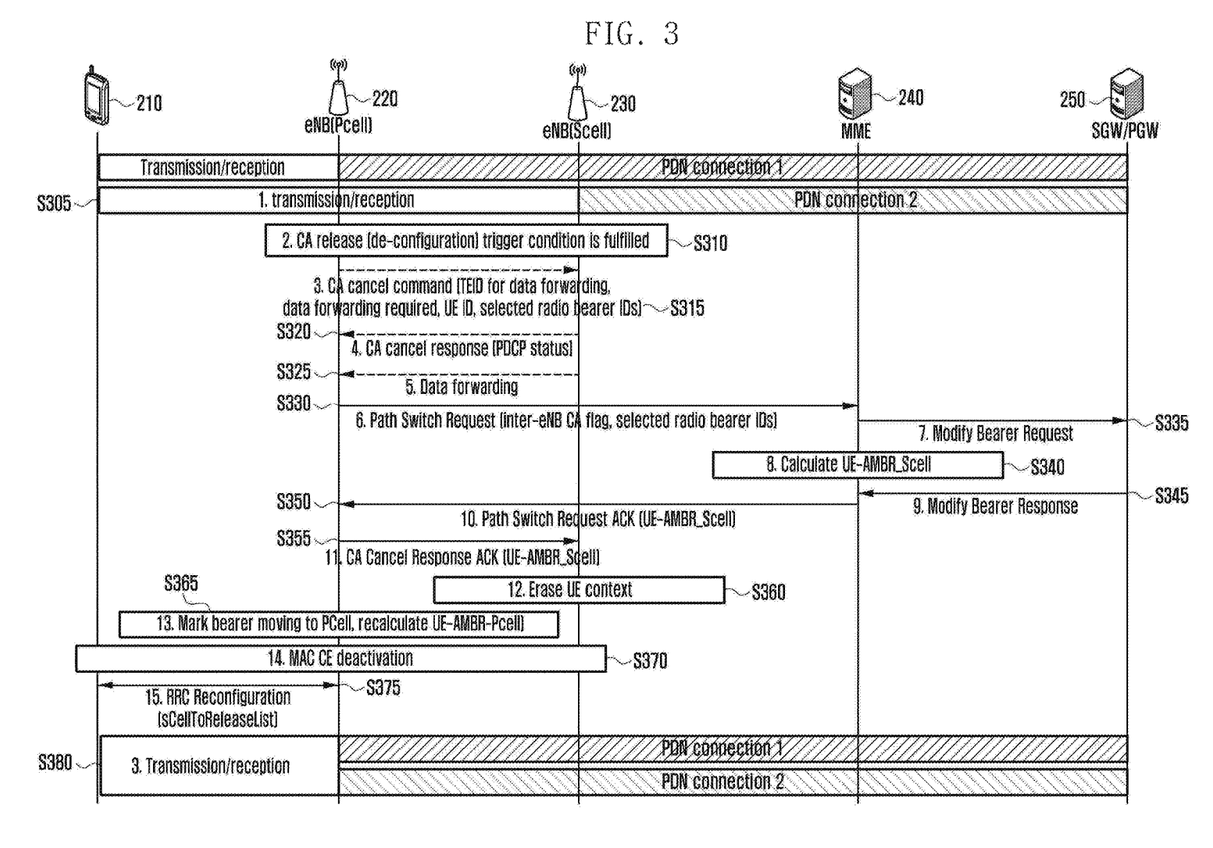
FIG. 3 is a signal flow diagram illustrating a procedure of releasing the inter-eNB CA configuration according to an embodiment of the present invention.

FIG. 3 is a signal flow diagram illustrating a procedure of releasing the inter-eNB CA configuration according to an embodiment of the present invention. In the following description, the inter-eNB CA configuration release method may be categorized into a method for the eNB (PCell) 220 to release the inter-eNB CA configuration after notifying the eNB (SCell) 230 thereof and a method for releasing without notifying thereof.

It is assumed that the PDN connection 1 is established for data communication via the eNB (PCell) 220 and the PDN connection 2 is established for data communication via the eNB (SCell) 230 at step S305.

If it is determined that the inter-eNB CA is not necessary anymore, the eNB (PCell) 220 releases the inter-eNB CA configuration at step S310.

First, a description is made of the method for the eNB (PCell) 220 to notify the eNB (SCell) 230 of the release of the inter-eNB CA configuration and then release the inter-eNB CA configuration.

In order to accomplish this, the eNB (PCell) 220 sends the eNB (SCell) 230 a CA Cancel Command message at step S315, the CA Cancel Command message including a UE ID (e.g., S-TMSI), a data forwarding requirement indicator, a TEID for data forwarding, and radio bearer IDs corresponding to PDN connections of which inter-eNB CA is to be released.

Upon receipt of the CA Cancel Command message, the eNB (SCell) 230 sends the eNB (PCell) 220 a CA Cancel Response message at step S320, the CA Cancel Response message including PDCP status information for data forwarding.

Then the eNB (SCell) 230 forwards the data to the eNB (PCell) 220 at step S325 and performs a Path Switch procedure.

In the case of releasing the inter-eNB CA configuration without notifying to the eNB (SCell) 230, steps S315 and S325 may be omitted and the eNB (PCell) 220 may perform the path switch procedure to block the path to the eNB (SCell) 230.

The eNB (PCell) 220 sends the MME 240 a Path Switch Request message to initiate the path switch procedure at step S330. The Path Switch Request message may include an inter-eNB CA flag indicating the inter-eNB CA and IDs of the radio bearers for which the eNB (PCell) 220 determines to release the CA in response to the request from the eNB (SCell) 230 (selected radio bearer IDs).

Upon receipt of the Path Switch Request message, the MME 240 sends the serving GW/PDN GW a Modify Bearer Request message to modify the data transmission path to the eNB (SCell) 230 at step S335.

The MME 240 calculates the UE-AMBR (UE-AMBR_Scell) for the eNB (SCell) 230 at step S340 and, if a Modify Bearer Response message is received from the serving GW at step S345, sends the eNB (PCell) 220 a Path Switch Request ACK message including the UE-AMBR_Scell at step S350. The eNB (PCell) 220 sends the eNB (SCell) 230 a CA Cancel Response ACK message including the UE-AMBR_Scell at step S355, and the eNB (SCell) 230 erases the corresponding UE context at step S360.

The eNB (PCell) 220 calculates UE-AMBR_Pcell based on the received UE-AMBR_Scell at step S365, and the eNB (PCell) 220 or the eNB (SCell) 230 transmits a Deactivation MAC CE to deactivate the Inter-eNB CA at step S370.

The eNB (PCell) 220 performs the RRC reconfiguration procedure to notify the UE of the updated situation of the inter-eNB CA at step S375.

In the case that the inter-eNB CA associated with the radio bearer IDs corresponding to the PDN connection 2, the data communication for both the PDN connections 1 and 2 is performed via the eNB (PCell) 220 at step S380.

Although the description is directed to the case where the bearers are process per PDN connection, it is also possible to process the bearers independently as well as per PDN connection.

In another embodiment of the present invention, a description is made of the method and apparatus for managing the AS security key in the case that the inter-eNB CA is applied.

In the case that the inter-eNB CA is performed as described with reference to FIG. 2, the eNB (PCell) 220 generates K_eNB* for the AS security Key to be used at the eNB (SCell) 230 and sends the eNB (SCell) 230 a CA Request message including the K_eNB*.

Then the eNB (SCell) 230 configures the K_eNB* received from the eNB (PCell) 220 as K_eNB to be used at the eNB (SCell) 230 and generates encryption and integrity protection AS Keys such as K_eNB_int and K_eNB_enc for use in communication with the UE.

Figure 4:
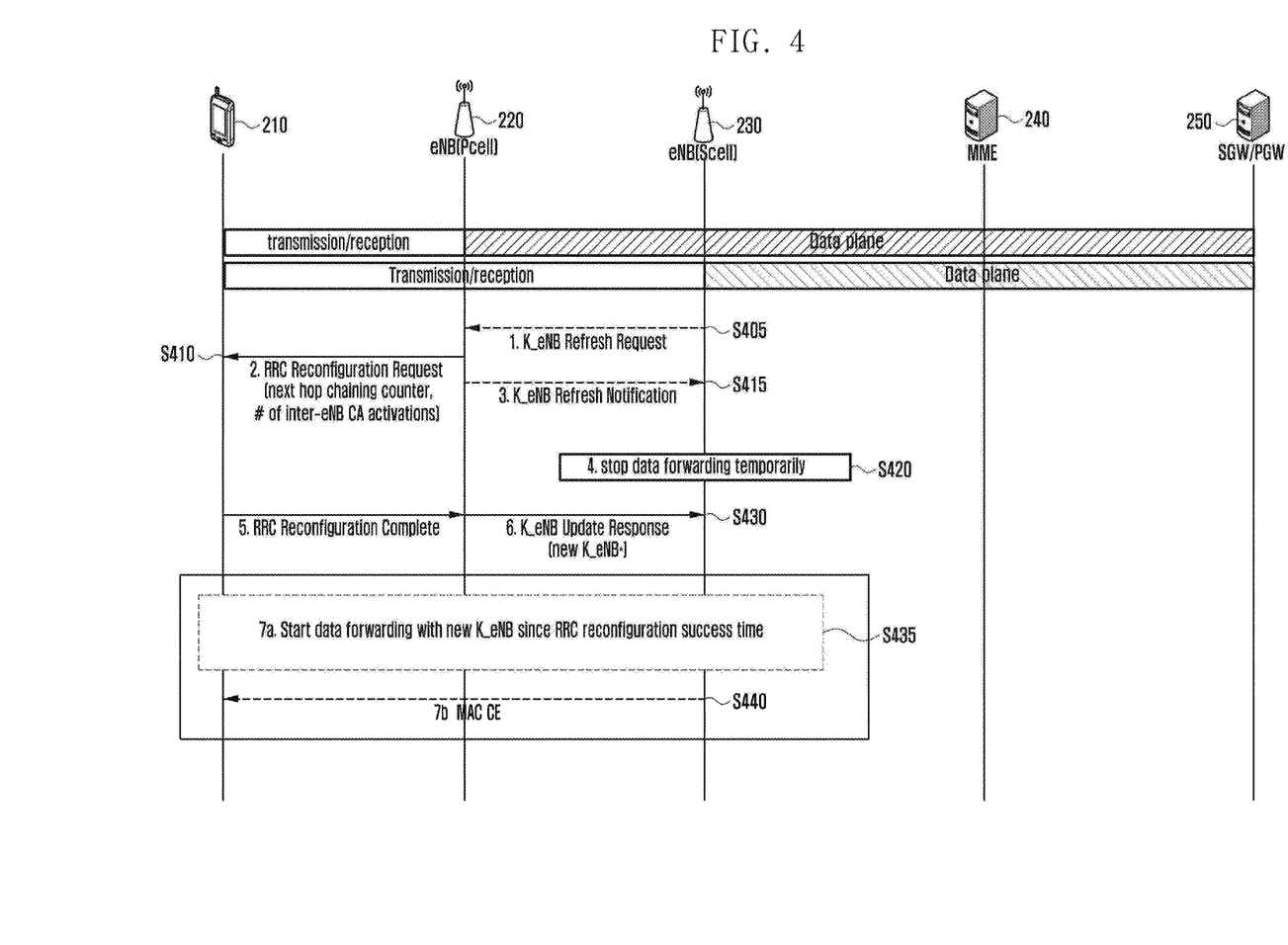
FIG. 4 is a signal flow diagram illustrating an AS key update procedure according to an embodiment of the present invention.

Afterward, if it is necessary to update the AS key (e.g. K_eNB refresh and K_eNB rekeying), the eNB (SCell) 230 updates the AS Key according to the procedure depicted in FIG. 4.

FIG. 4 is a signal flow diagram illustrating an AS key update procedure according to an embodiment of the present invention.

As shown in FIG. 4, if K_eNB refresh is required, the eNB (SCell) 230 sends the eNB (PCell) 220 a K_eNB refresh request at step S405.

At this time, the eNB (PCell) 220 performs the key refresh procedure by transmitting the RRC reconfiguration request message to the UE at step S410.

According to another embodiment of the present invention, since the eNB (PCell) 220 knows the key refresh is required already, it may skip the subsequent step S415.

After transmitting the K_eNB refresh request message or receiving a K_eNB refresh notification message at step S415, the eNB (SCell) 230 step forwarding data temporarily for Key refresh at step S420.

If it becomes necessary to perform K_eNB refresh or K_eNB rekeying, step S405 is omitted, and the eNB (PCell) 220 performs key refresh or key rekeying with the UE and sends the UE an RRC reconfiguration request message at step S410.

In order to notify the eNB (SCell) 230 that the AS key update is being performed, the eNB (PCell) 220 transmits a K_eNB update notification message at step S415. Upon receipt of the K_eNB update notification message, the eNB (SCell) 230 stop forwarding data temporarily for Key refresh at step S420.

The RRC reconfiguration request message may include a Next hop chaining counter (NCC) or a # of inter-eNB CA activations with the current K_eNB used in generating the K_eNB* at the UE. In order to indicate the case where the newly generated K_eNB* is used at the eNB (SCell) 230, the K_eNB_Scell refresh flag may be included.

In the case that the newly generated K_eNB* is used in both the eNB (PCell) 220 and eNB (SCell) 230, it is not necessary to include the K_eNB_Scell refresh flag.

If the new AS key is generated, the eNB (PCell) 220 generates a K_eNB* for use at the eNB (SCell) 230 based on the AS key and sends the eNB (SCell) 230 a K_eNB update response message including the new K_eNB*at step S430. At this time, the eNB (SCell) 230 use the received K_eNB*as the K_eNB.

The new K_eNB is applied by the eNB (SCell) 230 since the receipt of the K_eNB update request message such that the UE and the eNB (SCell) 230 use the new K_eNB.

The eNB (PCell) 220 may use the new K_eNB since the receipt of the RRC reconfiguration complete message at step S435.

In order to notify the start time of applying the new K_eNB, it is also possible for the eNB (SCell) 230 to send the UE a MAC CE such that the eNB (SCell) 230 and the UE start using the new K_eNB since the MAC CE transmission/reception at step S440.

Another embodiment proposes a method and apparatus of managing AS Key that can be used in updating the AS Key autonomously without receiving the AS key from the eNB (SCell) 230 in the inter-eNB CA situation.

Even in this method, the AS key update, which is caused by the AS key change at the eNB (PCell) 220, can be performed as described with reference to FIG. 4.

In the case that the inter-eNB CA is performed as described with FIG. 2, the eNB (PCell) 220 generates the K_eNB*for AS security Key at the eNB (SCell) 230 and sends the eNB (SCell) 230 a CA request message including the K_eNB*). Upon receipt of the K_eNB*from the eNB (PCell) 220, the eNB (SCell) 230 configures the K_eNB*as its K_eNB to generate the encryption and integrity protection AS Key such as K_eNB_int and K_eNB_enc based on the K_eNB for use in communication with the UE.

Figure 5:
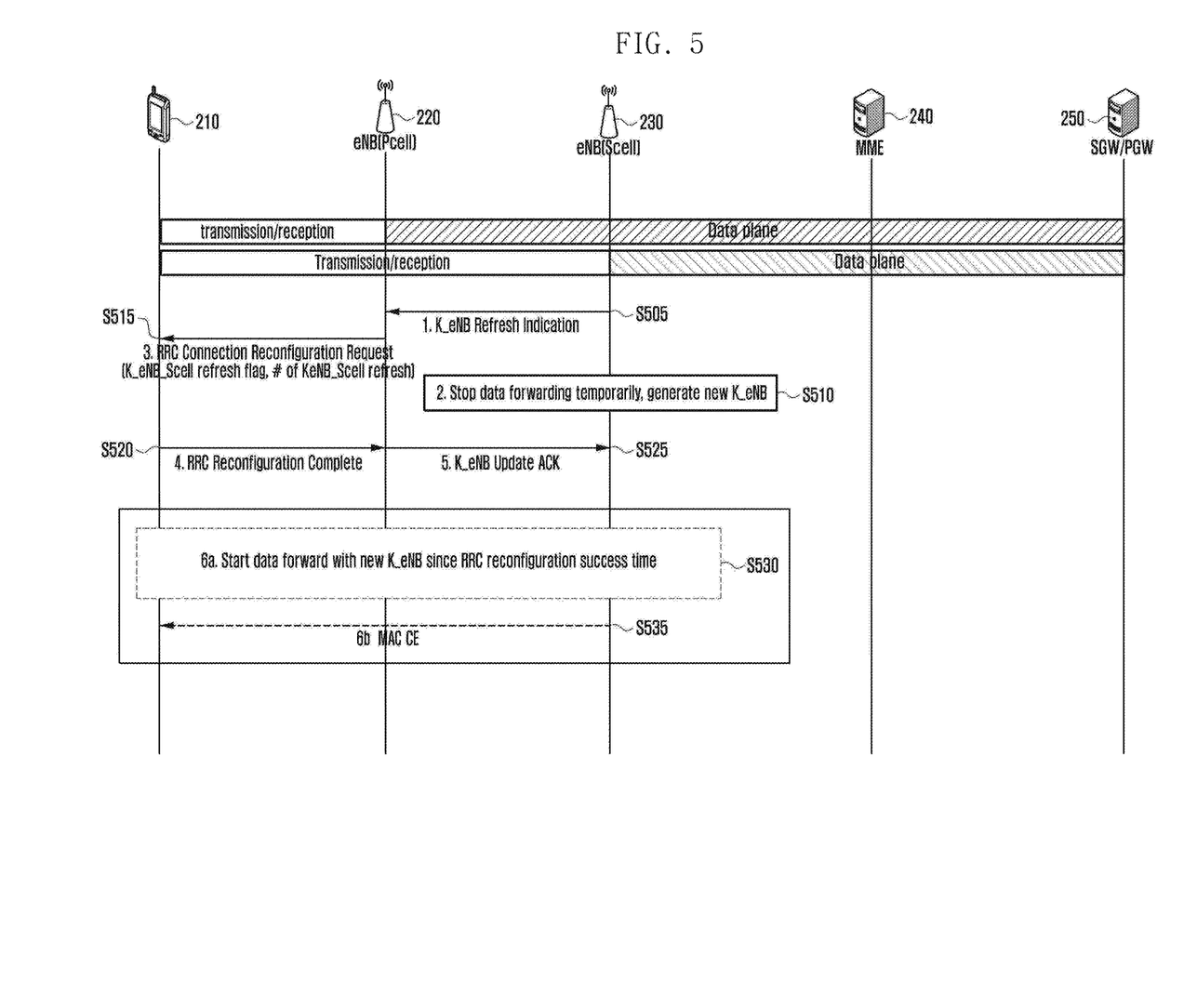
FIG. 5 is a signal flow diagram illustrating an AS Key update procedure according to another embodiment of the present invention.

Afterward, if it is necessary to update the AS key (e.g. K_eNB refresh), the eNB (SCell) updates the SK key according to the procedure of FIG. 5.

FIG. 5 is a signal flow diagram illustrating an AS Key update procedure according to another embodiment of the present invention.

As shown in FIG. 5, if the K_eNB refresh is necessary, the eNB (SCell) 230 sends the eNB (PCell) 220 a K_eNB refresh indication message at step S505 and stops forwarding data temporarily at step S510.

Next, the eNB (SCell) 230 generates a new K_eNB*according to the legacy K_eNB*generation method as shown in table 1 and uses the newly generated K_eNB*as K_eNB.

Upon receipt of the K_eNB refresh indication message, the eNB (PCell) 220 sends the UE the RRC reconfiguration request message to notify of the new AS key information at step S515.

The RRC reconfiguration request message may include at least one of a next hop chaining counter, a K_eNB_Scell refresh flag, and a number of inter-eNB CAs with current K_eNB for use in generating K_eNB*(# of K_eNB_Scell refresh).

If an RRC reconfiguration complete message is received at step S520, the eNB (PCell) 220 sends the eNB (SCell) 230 a K_eNB update acknowledgement message to notify that the AS key update of the eNB (SCell) 230 to the UE at step S525. Upon receipt of the K_eNB update acknowledgement message, the eNB (SCell) 230 starts using the new K_eNB.

The eNB (SCell) 230 starts using the new K_eNB since receipt of the K_eNB update acknowledgement message, and the UE starts using the new K_eNB since the transmission of the RRC reconfiguration message at step S520 such that the data forwarding is performed with the new K_eNB at step S530.

In order to notify the new K_eNB application start time, it is also possible for the eNB (SCell) 230 to send the UE a MAC CE such that the eNB (SCell) 230 and the UE use the new K_eNB since the MAC CE transmission/reception at step S535.

Table 1 shows a method of generating a new K_eNB*in which the eNB (PCell) 220 generates the new K_eNB*to the eNB (SCell) 230.

In the case of applying the method of table 1, the new K_eNB*is generated by repeating the K_eNB*generation procedure as many as the # of inter-eNB CA activations or # of KeNB_Scell refreshes in order to prevent a previously generated K_eNB*from being reused.

The AS key generation method may be used in the case that the eNB (SCell) 230 generates the AS key autonomously without involvement of the eNB (PCell) 220.

If the eNB (PCell) 220 and the eNB (SCell) 230 use the same AS key, the K_eNB*generated newly with table 1 is used at the eNB (PCell) 220 and the eNB (SCell) 230 (however, when configuring and activating the inter-eNB CA as in FIG. 2, if the UE and the eNB (PCell) 220 do not perform AS key refresh through the RRC reconfiguration procedure at process 6, the K_eNB which the eNB (PCell) 220 uses currently is configured as K_eNB*other than following table 1).

Otherwise if the eNB (PCell) 220 and the eNB (SCell) 230 use different AS keys, the newly generated K_eNB*is used only at the eNB (SCell) 230.

TABLE 1

K_eNB* generation method in which PCell generate K_eNB* to SCell
: New K_eNB* is generated by repeating the following Key generation procedure as many as #inter-CA activations or #_KeNB SCell refresh
K_eNB*=HMAC-SHA-256(K_eNB, s),
S=FC ll P0 ll L0 ll P1 ll L1, where
-FC=0x13
-P0=PCI(target physical cell id)
-L0=length of PCI(i.e. 0x00 0x02)
-P1=EARFCN-DL(target physical cell downlink frequency)
-L1-length of EARFCN-DL(i.e. 0x00 0x02)

Table 1 shows the K_eNB*generation method 1 in which the eNB (PCell) 220 generates a new AS key and transmits it to the eNB (SCell) 230.

Table 2 shows another method of generating a new K_eNB*in which the eNB (PCell) 220 generates the new K_eNB*and transmits it to the eNB (SCell) 230.

In the case of applying the method of table 2, the new K_eNB*is generated in consideration of the # of inter-eNB CA activations or # of KeNB_Scell refreshes to prevent a previously generated K_eNB*is not reused. The AS key generation method may be used in the case that the eNB (SCell) 230 generate the AS key autonomously without involvement of the eNB (pSCell) 220.

If the eNB (PCell) 220 and the eNB (SCell) 230 use the same AS key, the K_eNB*generated newly with table 2 is used at the eNB (PCell) 220 and the eNB. Otherwise if the eNB (PCell) 220 and the eNB (SCell) 230 use different AS keys, the newly generated K_eNB*is used only at the eNB (SCell) 230.

Table 2 shows a new K_eNB*generation method in consideration of the # of inter-eNB CA activations or # of KeNB_Scell refreshes to prevent a previously generated K_eNB*is not reused when the eNB (PCell) 220 and the eNB (SCell) 230 use different AS keys in which the new K_eNB*is generated using the K_eNB used by the eNB (PCell) 220 and transmitted to the eNB (SCell) 230.

TABLE 2

K_eNB* generation method in which eNB (PCell) generate K_eNB* to SCell (considering # of inter-CA activations or # of KeNB_Scell refresh)
K_eNB*=HMAC-SHA-256(K_eNB, s),
S=FC ∥ P0 ∥ L0 ∥ P1 ∥ L1 ∥ P2 ∥ L2, where
-FC=unused FC allocation (14, 1C~1F)
-P0=PCI(target physical cell id)
-L0=length of PCI(i.e. 0x00 0x02)
-P1=EARFCN-DL(target physical cell downlink frequency)
-L1=length of EARFCN-DL(i.e. 0x00 0x02)
-P2=NHKD-Scell(Number of horizontal key derivation w.r.t the K_eNB in Scell)
-L2=length of NHKD-Scell(i.e. 0x00 0x01)

Table 2 shows the K_eNB*generation method in which the eNB (PCell) 220 generates a new AS key and sends it to the eNB (SCell) 230 (considering # of inter-eNB CA activations or # of KeNB_Scell refresh).

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

For example, each of the eNB (PCell), the eNB (SCell), and the UE may include a transceiver for transmitting/receiving signals and a controller for performing the functions according to above described embodiments of the present invention.

For example, the eNB (PCell) may include a transceiver for transmitting/receiving signals and a controller. In this case, the controller may control to transmit and received data to and from the UE through at least two Packet Data Network (PDN) connections. The controller may control sending a CA request to the second eNB which participates in the CA when the inter-eNB CA is determined and receiving a CA response message from the second eNB in response to the CA request message. The controller also may control performing the RRC reconfiguration procedure with the UE to notify the UE of the inter-eNB CA determination, transmit a path switch request message to the MME to switch a path such that the data of at least one of PDN connections are transmitted/received via the second eNB.

Likewise, the controller of each of the eNB (SCell) and the UE may be configured to perform the functions described in the above embodiments of the present invention.

The invention claimed is:

1. A method by a first base station in a wireless communication system, the method comprising:
transmitting, to a second base station, a first message including information on at least one bearer for which inter-base station carrier aggregation is configured;
receiving, from the second base station, a second message including configuration information for the at least one bearer;
transmitting, to a terminal, a third message including the configuration information for the at least one bearer; and
transmitting, to a mobility management entity, a fourth message for requesting modification of configuration for the at least one bearer,
wherein the at least one bearer is configured to use only radio resources provided by the second base station.

2. The method of claim 1, further comprising transmitting, to the second base station, a fifth message to release the inter-base station carrier aggregation.

3. The method of claim 1, further comprising forwarding data to the second base station.

4. The method of claim 2, further comprising receiving, from the second base station, a forwarded data.

5. The method of claim 1, wherein the second base station is directly connected with a serving gateway (GW) according to the at least one bearer.

6. A method by a second base station in a wireless communication system, the method comprising:
receiving, from a first base station, a first message including information on at least one bearer for which inter-base station carrier aggregation is configured;
transmitting, to the first base station, a second message including configuration information for the at least one bearer; and
receiving, from the first base station, a forwarded data,
wherein the configuration information for the at least one bearer is transmitted to the terminal, and
wherein the at least one bearer is configured to use only radio resources provided by the second base station.

7. The method of claim 6, further comprising receiving, from the first base station, a third message to release the inter-base station carrier aggregation.

8. The method of claim 7, further comprising forwarding data to the first base station.

9. The method of claim 6, wherein the configuration information for the at least one bearer is used by the first base station to request modification of configuration for the at least one bearer to a mobility management entity.

10. The method of claim 6, wherein the second base station is directly connected with a serving gateway (GW) according to the at least one bearer.

11. A first base station in a wireless communication system, the first base station comprising:
a transceiver; and
a controller configured to:
control the transceiver to transmit, to a second base station, a first message including information on at least one bearer for which inter-base station carrier aggregation is configured,
control the transceiver to receive, from the second base station, a second message including configuration information for the at least one bearer,
control the transceiver to transmit, to a terminal, a third message including the configuration information for the at least one bearer, and
control the transceiver to transmit, to a mobility management entity, a fourth message for requesting modification of configuration for the at least one bearer,
wherein the at least one bearer is configured to use only radio resources provided by the second base station.

12. The first base station of claim 11, wherein the controller is further configured to control the transceiver to transmit, to the second base station, a fifth message to release the inter-base station carrier aggregation.

13. The first base station of claim 11, wherein the controller is further configured to control the transceiver to forward data to the second base station.

14. The first base station of claim 12, wherein the controller is further configured to control the transceiver to receive, from the second base station, a forwarded data.

15. The first base station of claim 11, wherein the second base station is directly connected with a serving gateway (GW) according to the at least one bearer.

16. A second base station in a wireless communication system, the second base station comprising:

a transceiver; and a controller configured to:

control the transceiver to receive, from a first base station, a first message including information on at least one bearer for which inter-base station carrier aggregation is configured,     control the transceiver to transmit, to the first base station, a second message including configuration information for the at least one bearer, and     control the transceiver to receive, from the first base station, a forwarded data, wherein the configuration information for the at least one bearer is transmitted to the terminal, and wherein the at least one bearer is configured to use only radio resources provided by the second base station.

17. The second base station of claim 16, wherein the controller is further configured to control the transceiver to receive, from the first base station, a third message to release the inter-base station carrier aggregation.

18. The second base station of claim 17, wherein the controller is further configured to control the transceiver to forward data to the first base station.

19. The second base station of claim 16, wherein the configuration information for the at least one bearer is used by the first base station to request modification of configuration for the at least one bearer to a mobility management entity.

20. The second base station of claim 16, wherein the second base station is directly connected with a serving gateway (GW) according to the at least one bearer.

* * * * *